United States Patent
Ramirez Blanco et al.

(10) Patent No.: US 8,016,235 B2
(45) Date of Patent: Sep. 13, 2011

(54) COVER FOR AN AIRCRAFT ACCESS OPENING

(75) Inventors: Gonzalo Ramirez Blanco, Madrid (ES); Jose Luis Lozano Garcia, Madrid (ES); Daniel Barroso Vloedgraven, Madrid (ES)

(73) Assignee: Airbus Espana S.L., Getafe, Madrid (ES)

( * ) Notice: Subject to any disclaimer, the term of this patent is extended or adjusted under 35 U.S.C. 154(b) by 960 days.

(21) Appl. No.: 11/897,007

(22) Filed: Aug. 28, 2007

(65) Prior Publication Data
US 2009/0294591 A1 Dec. 3, 2009

(30) Foreign Application Priority Data
Jun. 29, 2007 (ES) .................................. 200701834

(51) Int. Cl.
*B64C 1/14* (2006.01)
(52) U.S. Cl. ..................................... 244/119; 244/129.4
(58) Field of Classification Search ............... 244/129.4, 244/129.3, 119, 123.1; 52/84, 208, 466, 52/465
See application file for complete search history.

(56) References Cited

U.S. PATENT DOCUMENTS

| | | | | |
|---|---|---|---|---|
| 2,293,656 A | * | 8/1942 | McClain | 52/208 |
| 3,429,530 A | * | 2/1969 | Hertel | 244/129.3 |
| 4,541,595 A | * | 9/1985 | Fiala et al. | 244/129.3 |
| 5,014,934 A | * | 5/1991 | McClaflin | 244/132 |
| 6,889,937 B2 | * | 5/2005 | Simpson et al. | 244/123.1 |
| 6,964,723 B2 | * | 11/2005 | Lindsay et al. | 156/285 |
| 7,651,756 B2 | * | 1/2010 | Albers et al. | 428/138 |

* cited by examiner

*Primary Examiner* — Tien Dinh
(74) *Attorney, Agent, or Firm* — Ladas & Parry LLP

(57) ABSTRACT

The invention relates to a cover for the access opening in a composite material aircraft structure, characterized in that it comprises the following elements:
  an outer cover (18) arranged on the outer part of the aircraft skin (28), the carbon fiber layers (14) forming the skin (28) being deformed towards the inner part of the aircraft structure, leaving enough space between the aircraft structure and the outer part of the skin (28) for the seating of the outer cover (18).
  a composite material plate (15) arranged in the outer part of the skin (28) and surrounding the area for installing the outer cover (18);
  an inner cover (27) arranged on the inner part of the aircraft skin (28).

6 Claims, 4 Drawing Sheets

COVER FOR AN AIRCRAFT ACCESS OPENING

FIELD OF THE INVENTION

The present invention relates to a cover for an access opening in a composite material aircraft structure.

BACKGROUND OF THE INVENTION

The access openings for aircraft fuel tanks and the covers of said access openings in aeronautical structures are necessary for both the assembly and subsequent aircraft maintenance and inspection tasks, during the entire life of such aircraft. The requirements of these accesses vary according to the type of access which they must allow and to the frequency of their use.

For the particular case of aircraft wings and stabilizers, this access is typically carried out through access covers, which must comply with the following requirements:
- the size must be appropriate to the accessibility requirements;
- the cover must be sealed for the purpose of preventing fuel losses;
- the impact requirements must be complied with;
- the covers must be assembled and disassembled as quickly and easily as possible;
- the covers must be exchangeable.

There are several known solutions for this type of covers for access openings located in the lower part of structures of stabilizers and of wings. The structures of aircraft stabilizers and wings have typically been metallic to date. However, these structures are currently made of composite materials, mainly in carbon fiber, therefore the design and the conception of the covers for access openings must be different.

The properties of carbon fiber and of metal are different, the machining capability of carbon fiber further more being much lower than of metal. The known solution for the covers of access openings in metallic aeronautical structures, which comprises making cavities in the skins for the subsequent installation of the covers of access openings, is thus not feasible in skins made of carbon fiber. A new design of a cover for access openings in carbon fiber aeronautical structures that does not comprise cavities in the skins is therefore necessary. In addition, in the typical design based on carbon fiber structures, the skin is bored in several positions for the installation of screws which will close the access opening cover. These boreholes on the skin for the case of carbon fiber structures is neither convenient not easy to carry out. In addition, the fact of having to use boreholes to fix the cover to the skin complicates the exchangeability of the element. In the attempt to adapt the typical access opening cover of metallic aerodynamic structures to carbon fiber aerodynamic structures, the main problem to be solved upon adapting the cover to the fiber skin is the manner of arranging the outer cover inside the aerodynamic contour of the stabilizer or wing profile, taking into consideration, as has been mentioned, that carbon fiber is not easy to machine.

The present invention is aimed at satisfying this demand.

SUMMARY OF THE INVENTION

The present invention relates to a cover for the access opening in a composite material aircraft structure, particularly made of carbon fiber. This type of covers is mainly used in aircraft stabilizers and wings, typically in fuel tank areas, and allows the complete access by the entire body of a person to the inner structure of the aircraft component in question.

The type of cover for the access opening in a composite material aircraft structure comprises the following elements:
- an outer and an inner cover;
- an adjusting washer between the inner cover and the skin;
- sealing profiles between the inner cover and the adjusting washer and between the outer cover and the skin;
- a plate between the skin and the outer cover.

Other features and advantages of the present invention will be understood from the following detailed description of an illustrative embodiment of its object in relation to the attached figures.

DETAILED DESCRIPTION OF THE INVENTION

Figure 1:
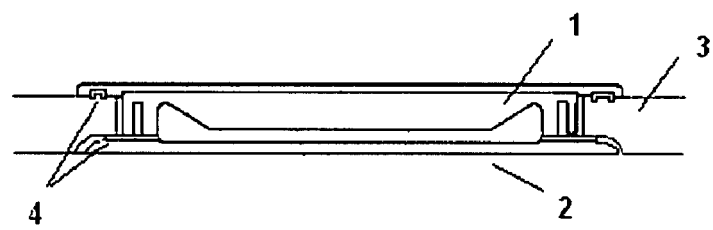
FIG. 1 shows a cover for the access opening of a known metallic aircraft structure.

As observed in FIG. 1, one of the typically used solutions for the access opening covers of metallic aircraft structures, particularly in the lower surface of the wings of aerodynamic structures, comprises two separate covers, an inner cover 1 and an outer cover 2, the inner cover 1 being located inside the fuel tank, and the outer cover 2 being located on the aerodynamic surface. The covers 1 and 2 are arranged together by means of screwing, comprising between them the metallic skin panel 3. The closing sealing profiles 4 are arranged at the ends of the covers 1 and 2. In order to maintain the aerodynamic surface, a cavity 5 is machined in the outer face of the skin 3, to install the outer cover 2.

Figure 2:
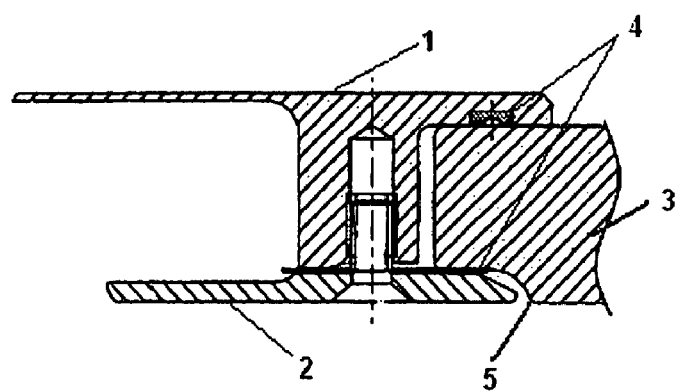
FIG. 2 shows a detail of the installation of a cover for the access opening of a known metallic aircraft structure.

As can be seen in FIG. 2, the two covers 1 and 2 are screwed together. The pressure thus obtained seals the cover by means of the action of two sealing profiles 4, one profile being arranged in the inner cover 1 and the other profile being arranged between both covers 1 and 2.

Figure 3:
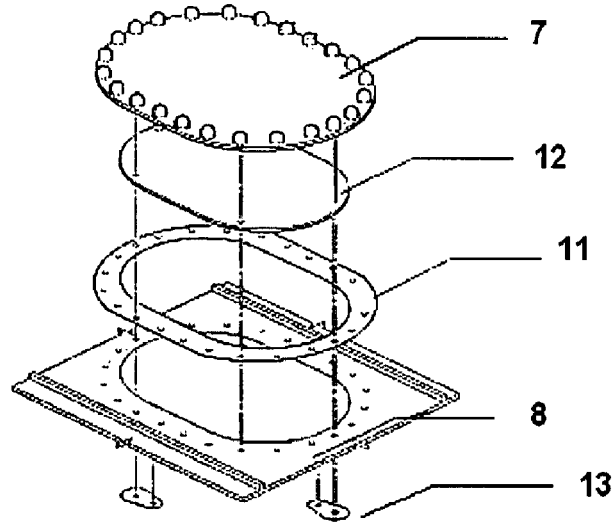
FIG. 3 shows a cover for the access opening of a known composite material aircraft structure.
Figure 4:
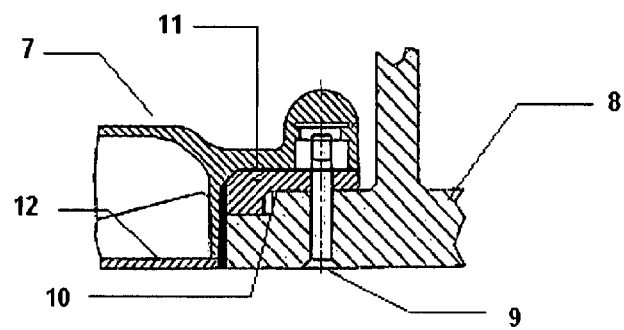
FIG. 4 shows a detail of the installation of a cover for the access opening of a known composite material aircraft structure.

As observed in FIGS. 3 and 4, the known solution for composite material aircraft structures, mainly made of carbon fiber is different from the solution described above for metallic aircraft structures.

In this known solution for composite material aircraft structures, the type of access opening cover thus comprises the following elements:

- an inner cover 7 screwed to the skin 8 of the composite material aircraft structure by means of countersunk-head screws 9, a sealing profile 10 between the inner cover 7 and an adjusting washer 11 occasionally being necessary to prevent leakages;
- an adjusting washer 111 secured to the inner face of the skin 8 to obtain the suitable planar surface for the correct seating of the cover;
- an outer plate 12, screwed to the inner cover 7, conferring the necessary aerodynamic surface to the assembly;
- electrical ground connections 13.

In the attempt to adapt the typical access opening cover of metallic aerodynamic structures to carbon fiber aerodynamic structures, the main problem to be solved upon adapting the cover to the fiber skin is the manner of arranging the outer cover inside the aerodynamic contour of the stabilizer or wing profile, taking into consideration, as has been mentioned, that carbon fiber is not easy to machine. The solution set forth by the present invention comprises the inclusion of the cavity 5 described in metallic structures (FIGS. 1 and 2) in its original form, modifying the design and the process for manufacturing the skin 28 so as to adapt it to the new cover.

Figure 5:
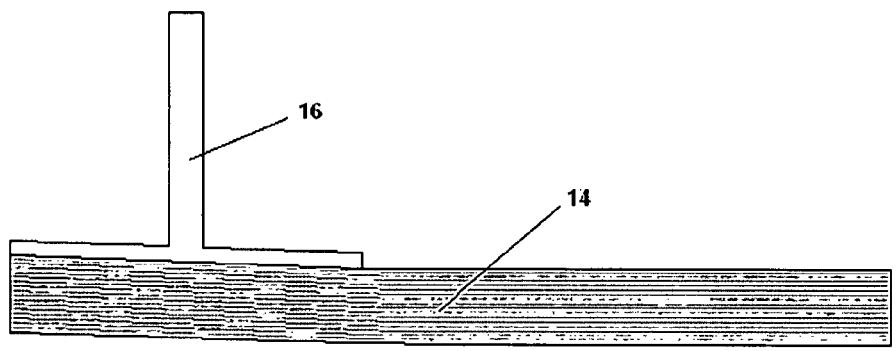
FIG. 5 shows the deformation of composite material layers for the adaptation to the aircraft structure surface in the installation of a cover for the access opening of a composite material aircraft structure according to the invention.
Figure 6:
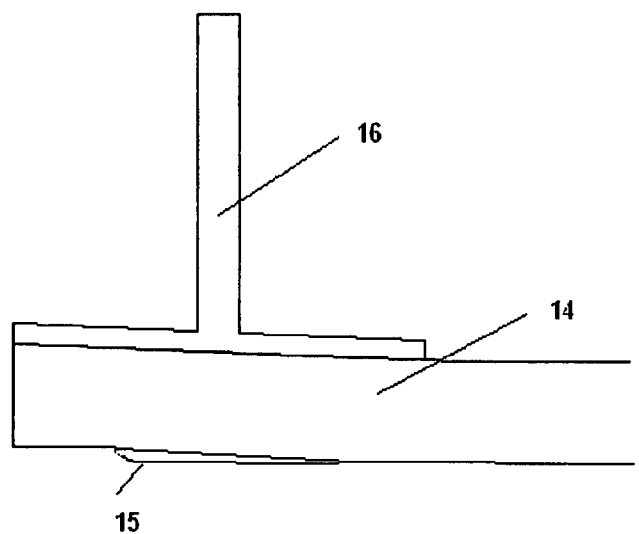
FIG. 6 shows in detail the plate used to install a cover for the access opening of a composite material aircraft structure according to the invention.
Figure 7:
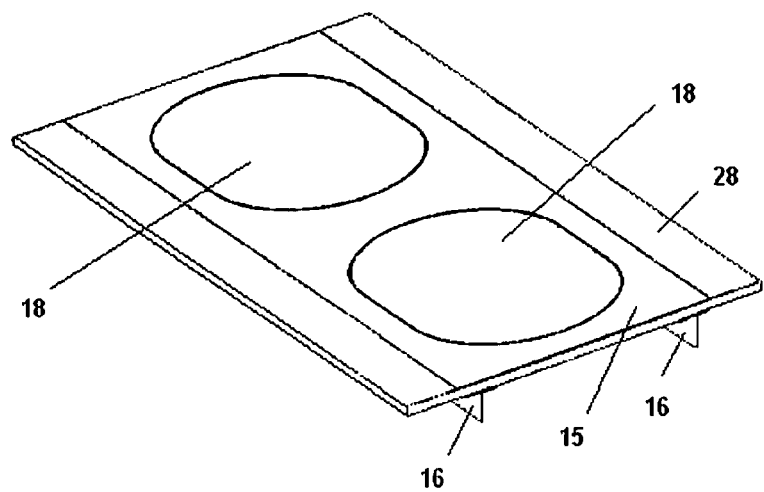
FIG. 7 shows a detail of the line of the access openings and the arrangement of the plate of a cover for the access opening of a composite material aircraft structure according to the invention.
Figure 8:
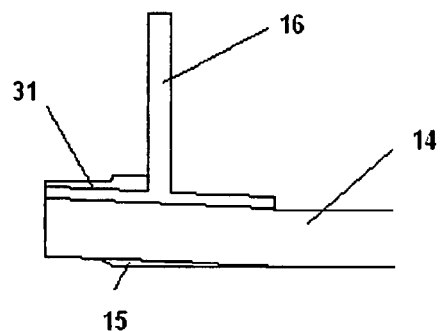
FIG. 8 shows in detail the adjusting washer of a cover for the access opening of a composite material aircraft structure according to the invention.
Figure 9:
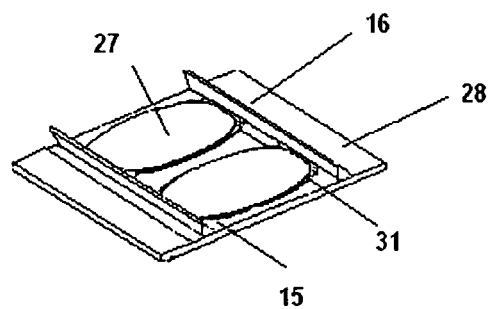
FIG. 9 shows a detail of the arrangement of the adjusting washer of a cover for the access opening of a composite material aircraft structure according to the invention.

In the area surrounding the access opening, the carbon fiber layers 14 are thus deformed towards the inner part of the torsion box, leaving enough space between the aerodynamic surface and the outer face of the skin 28 for the seating of the cover 18 (see FIG. 5).

Since the slopes of the carbon fiber parts 14 are limited, the deformed area is greater than that necessary for the correct seating of the cover 18. A carbon fiber plate 15 can be cured together with the base of skin 28 to cover these areas.

As the access openings are usually not insulated, and a complete line along the stabilizer or wing span is usually necessary, a continuous plate 15 must be extended along the line of the access openings.

The inner face of the skins 28 of a torsion box are usually stiffened by means of installing stringers 16. The separation between these stiffening elements 16 is normally optimized for a specific typology. The most extreme and complicated case, which occurs when the separation between the stringers 16 is so small that the distance between the access opening and the foot of the stringer 19 is very small or even nil, has been considered in order to develop the invention. In this case, it is necessary to install an adjusting washer 31 to achieve a correct seating of the inner cover 27.

In a more general situation, when the distance between the foot of the stringer 16 and the access opening is sufficient, the adjusting washer 31 may not be placed, if the inner face is sufficiently planar and allows a correct seating of the cover.

A sealing profile 30 may be placed between this adjusting washer 31 and the inner cover 27, to thus ensure the sealing and prevent any leakage. If a double sealing is necessary, a second profile sealing 17 can be installed in the outer cover 18.

Figure 10:
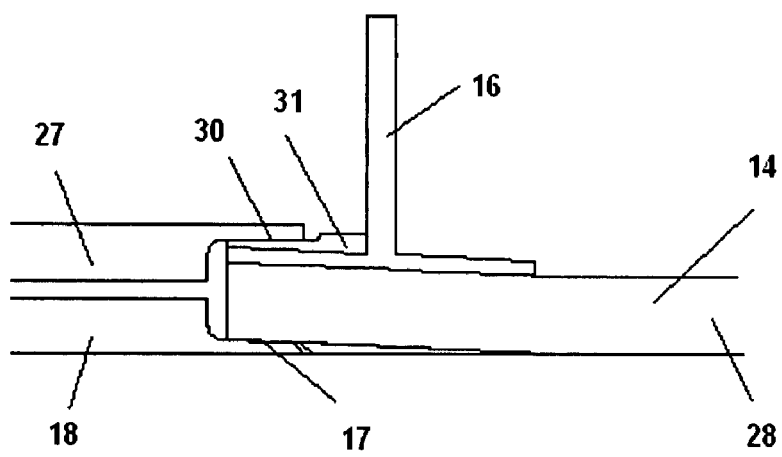
FIG. 10 shows a detail of the assembly of the cover for the access opening of a composite material aircraft structure according to the invention.

The installation can be carried out once the area is prepared for the correct seating of the outer cover 18 and the inner cover 27, screwing both parts 18 and 27, and comprising the skin 28 and, where appropriate, the adjusting washer 31 between them. This can be observed in FIGS. 10 and 11.

Figure 11:
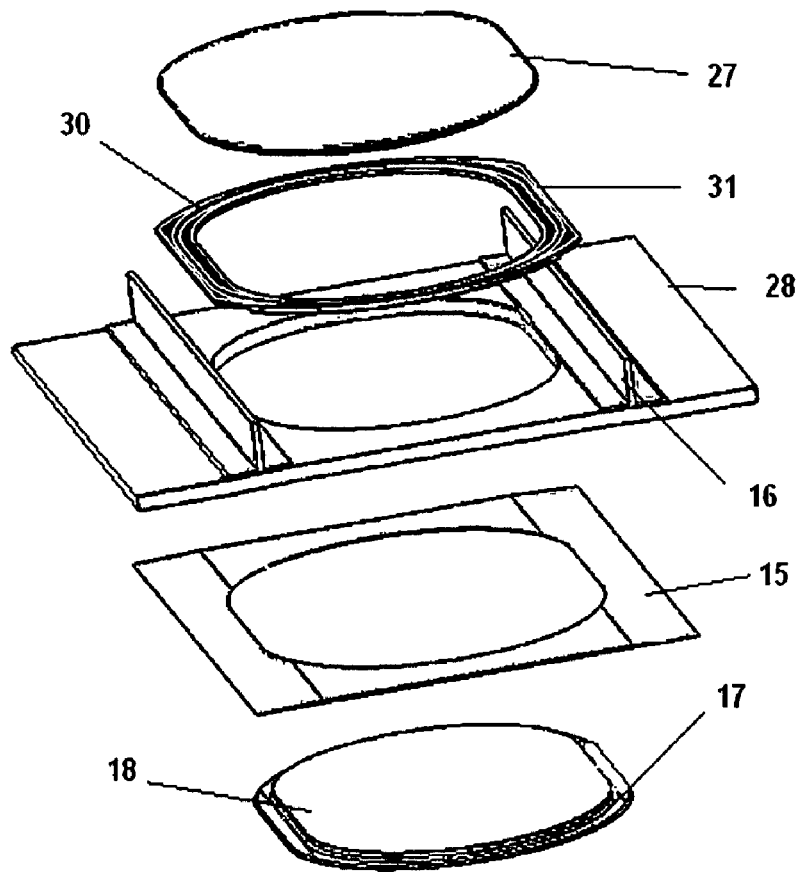
FIG. 11 shows an exploded view of the cover for the access opening of a composite material aircraft structure according to the invention.

As can be seen in FIG. 11, the cover for the access opening in a composite material aircraft structure according to the invention comprises the following elements as a whole:

outer 18 and inner 27 cover;
adjusting washer 31;
sealing profiles (not shown);
plate 15.

The modifications described within the scope defined by the following claims can be introduced in the embodiments which have just been described.

The invention claimed is:

1. A cover for an access opening in a composite material aircraft structure, comprising:
   an outer cover (18) arranged on an outer part of an aircraft skin (28), carbon fiber layers (14) forming the skin (28) being deformed towards an inner part of the aircraft structure, leaving enough space between the aircraft structure and the outer part of the skin (28) for seating the outer cover (18);
   a composite material plate (15) arranged in the outer part of the skin (28) and surrounding an area for installing the outer cover (18); and
   an inner cover (27) arranged on the inner part of the aircraft skin (28).

2. The cover for the access opening in a composite material aircraft structure according to claim 1, wherein the composite material plate (15) is cured together with a base of the skin (28).

3. The cover for the access opening in a composite material aircraft structure according to claim 1, further comprising an adjusting washer (31) between the inner cover (27) and the outer part of the skin (28) to allow a correct seating of the inner cover (27).

4. The cover for the access opening in a composite material aircraft structure according to claim 3, further comprising a sealing profile (30) between the adjusting washer (31) and the inner cover (27) to ensure a correct sealing of the inner cover (27) and prevent leakages.

5. The cover for the access opening in a composite material aircraft structure according to claim 1, further comprising a sealing profile (17) in the outer cover (18) which seals the outer cover (18) against the outer part of the skin (28).

6. The cover for the access opening in a composite material aircraft structure according to claim 1, wherein said cover is installed by screwing the outer cover (18) and the inner cover (27) to one another, the skin (28) being located between the inner cover (27) and the outer cover (28).

* * * * *